United States Patent
Bray et al.

(10) Patent No.: US 7,724,483 B2
(45) Date of Patent: May 25, 2010

(54) SYSTEMS AND METHODS INVOLVING PROTECTION OF SUPERCONDUCTING GENERATORS FOR POWER APPLICATIONS

(75) Inventors: James William Bray, Niskayuna, NY (US); Patrick Lee Jansen, Scotia, NY (US); Evangelos Trifon Laskaris, Schenectady, NY (US); Kiruba Sivasubramaniam, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 245 days.

(21) Appl. No.: 12/051,160

(22) Filed: Mar. 19, 2008

(65) Prior Publication Data

US 2009/0237845 A1    Sep. 24, 2009

(51) Int. Cl.
*H02H 7/00* (2006.01)
*H02H 47/00* (2006.01)
*H01F 1/00* (2006.01)
*H01F 6/00* (2006.01)

(52) U.S. Cl. .......................... 361/19; 361/141; 335/216

(58) Field of Classification Search ..................... None
See application file for complete search history.

(56) References Cited

U.S. PATENT DOCUMENTS

| | | | |
|---|---|---|---|
| 5,153,803 A * | 10/1992 | Rapeaux et al. | 361/19 |
| 5,210,674 A * | 5/1993 | Yamaguchi et al. | 361/19 |
| 5,218,505 A * | 6/1993 | Kubo et al. | 361/19 |
| 5,225,956 A * | 7/1993 | Hara et al. | 361/19 |
| 5,303,111 A * | 4/1994 | Yamaguchi | 361/19 |
| 5,999,383 A | 12/1999 | Hall et al. | |
| 7,053,509 B2 * | 5/2006 | Ryan et al. | 310/68 C |
| 7,342,757 B2 * | 3/2008 | Huang et al. | 361/23 |
| 7,630,179 B2 * | 12/2009 | Umans | 361/19 |
| 2007/0063799 A1 * | 3/2007 | Umans | 335/216 |

* cited by examiner

*Primary Examiner*—Stephen W Jackson
*Assistant Examiner*—Dharti H Patel
(74) *Attorney, Agent, or Firm*—Ann M. Agosti

(57) ABSTRACT

A system for protecting superconducting generator field coils including a controller configured to monitor for a quenching of a superconducting field coil of a generator and control a dissipation of a current flow in the superconducting field coil in an event of the quenching, and an armature coil of the generator configured to cause the dissipation of the current flow in the superconducting field coil responsive to the controller in the event of the quenching of the superconducting field coil. A method for protecting superconducting generator field coils including monitoring for a quenching of a superconducting field coil of a generator, and dissipating a current flow in the superconducting field coil via an armature coil of the generator in response to a detection of the quenching.

19 Claims, 3 Drawing Sheets

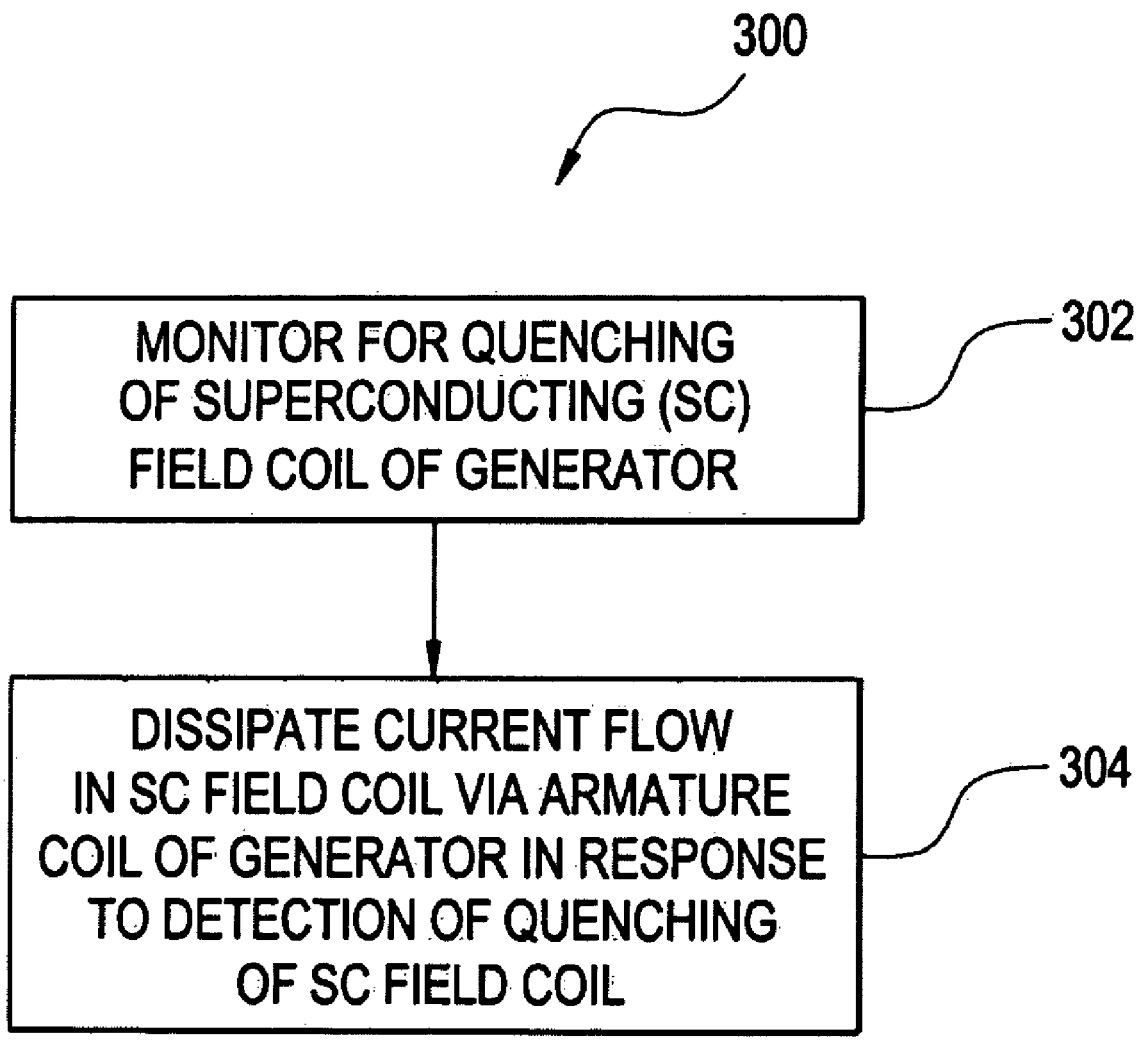

SYSTEMS AND METHODS INVOLVING PROTECTION OF SUPERCONDUCTING GENERATORS FOR POWER APPLICATIONS

BACKGROUND

Embodiments of the invention relate generally to superconducting generators, and more particularly to systems and methods involving protection of superconducting generators for power applications.

In this regard, the protection of a superconducting generator field coil, which is constructed of a superconducting material ("superconductor"), is important to prevent damage of the field coil or other components in the event of a malfunction. For example, during generator operation, if the superconducting field coil rises above a certain temperature, thereby causing it to transition into a non-superconducting or "normal" state (a process known as "quenching"), this can result in significant damage to the field coil and/or other components rendering the generator inoperable and possibly unsalvageable. To prevent such damage when quenching occurs, it is important to dissipate the electrical current flow in the field coil to avoid excessive heating as a result of the increased resistance that occurs when the superconductor becomes normal. An external resistor that is connected in series with the field coil during quenching has been used for such purpose. However, this external resistor is usually large and heavy, which impacts the use of the generator in various power applications due to increased size, weight, associated costs, etc. Therefore, the ability to quickly dissipate the electrical current flow in the field coil during quenching without the use of an external resistor is desirable.

BRIEF DESCRIPTION

Systems and methods involving protection of superconducting generators for power applications include, in an exemplary embodiment, a system for protecting superconducting generator field coils including a controller configured to monitor for a quenching of a superconducting field coil of a generator and control a dissipation of a current flow in the superconducting field coil in an event of the quenching, and an armature coil of the generator configured to cause the dissipation of the current flow in the superconducting field coil responsive to the controller in the event of the quenching of the superconducting field coil.

Another exemplary embodiment includes a method for protecting superconducting generator field coils including monitoring for a quenching of a superconducting field coil of a generator, and dissipating a current flow in the superconducting field coil via an armature coil of the generator in response to a detection of the quenching.

BRIEF DESCRIPTION OF THE DRAWINGS

These and other features, aspects, and advantages will become better understood when the following detailed description is read with reference to the accompanying drawings in which like characters represent like parts throughout the drawings, wherein:

FIG. 3 is a flow diagram illustrating an exemplary method for protecting superconducting generator field coils in accordance with exemplary embodiments of the invention.

DETAILED DESCRIPTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed, in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Superconducting generators provide lighter weight, smaller size, and more efficient operation than traditional generators of the same or similar capacity and, thus, are beneficial in various power applications, such as wind turbine systems. The protection of the superconducting field coils of superconducting generators is important to prevent damage to the field coils and/or other components and to reduce the recovery time of the generators in the event of a malfunction such as a quenching event (i.e., a transition to a non-superconducting or normal state). The armature coils of a superconducting generator can be configured for use to dissipate current flow in the superconducting field coils to provide this protection during such events.

Figure 1:
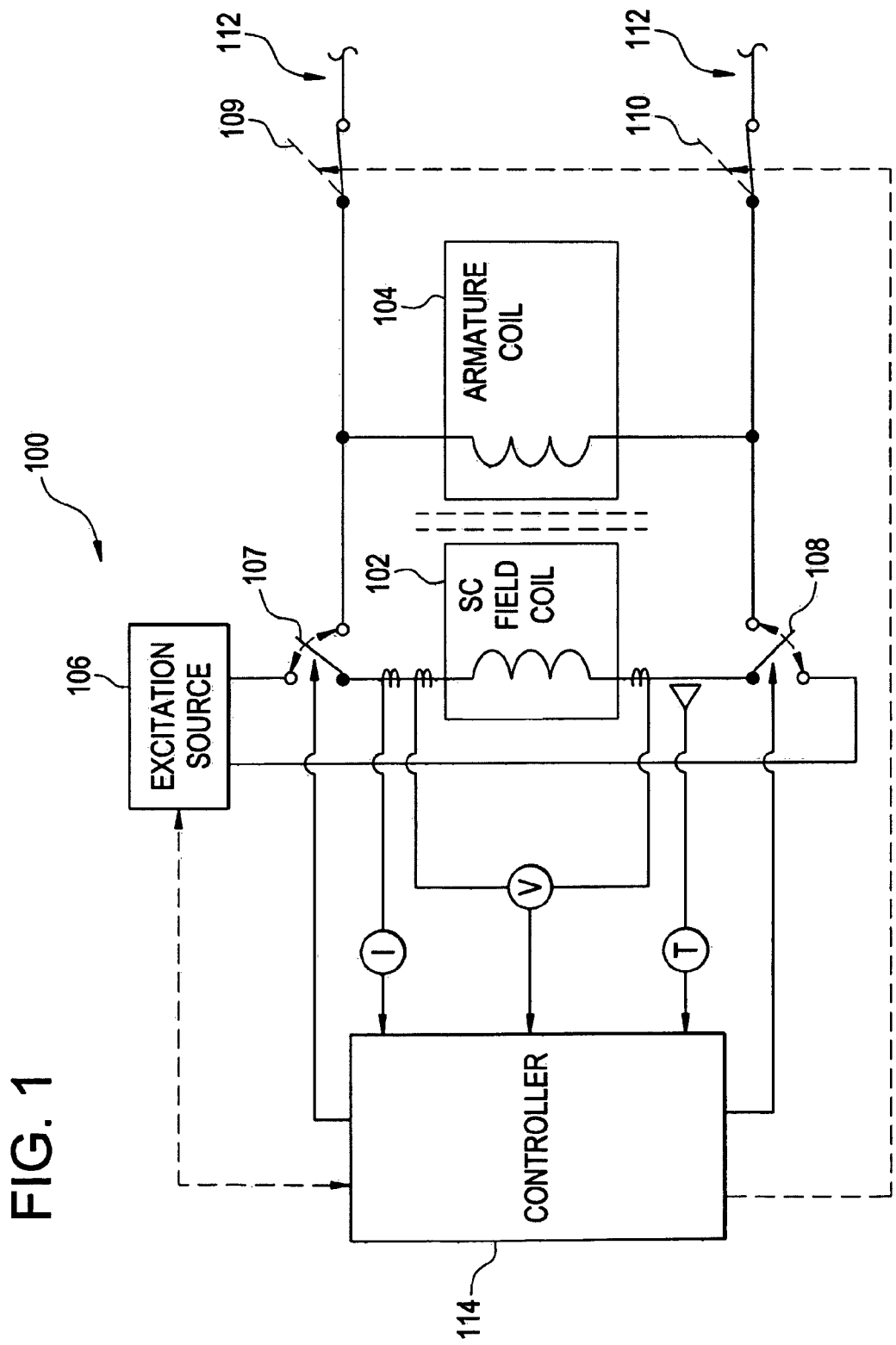
FIG. 1 is a schematic diagram illustrating an exemplary system for protection of superconducting generator field coils in accordance with exemplary embodiments of the invention.

FIG. 1 is a schematic diagram of an exemplary system 100 for protection of superconducting generator field coils in accordance with exemplary embodiments of the invention. Exemplary system 100 can be part of a superconducting generator (not depicted) and includes one or more superconducting (SC) field coils 102 and one or more armature coils 104. SC field coil 102 is constructed of a superconducting material such as niobium-titanium (NbTi), niobium-tin ($Nb_3Sn$), magnesium-diboride ($MgB_2$) or a high temperature superconductor (HTS) such as bismuth strontium calcium copper oxide (e.g., BSCCO-2212 or BSCCO-2223) or yttrium barium copper oxide (e.g., $YBa_2Cu_3O_7$ or "YBCO"). Armature coil 104 is constructed of a traditional coil conductor such as copper and is capable of dissipating a current flow in SC field coil 102, e.g., directly or inductively. SC field coil 102 is connected to an excitation source ("exciter") 106 via one or more switches 107, 108 in a first state. Switches 107, 108 can disconnect SC field coil 102 from exciter 106 and connect SC field coil 102 to armature coil 104 in a second state. Armature coil 104 is connected to an output 112 of the generator, which connection may be via one or more switches 109, 110 in a first state that can disconnect armature coil 104 from generator output 112 in a second state. Generator output 112 may include connections to various other components of the generator that are not depicted.

Switches 107-110 can be of any form capable of functioning under operating characteristics of the generator (e.g., voltage, current, temperature, etc.). For example, one or more of switches 107-110 may be electronic or mechanical. Switches 107-110 are controlled by controller 114, e.g., via control conductors or wiring. Controller 114 also monitors one or more operating characteristics of SC field coil 102 such as current I, voltage V, and/or temperature T, e.g., via control wiring, transducers, etc. (e.g., as depicted). Controller 114 may also be in communication with exciter 106, e.g., to monitor and/or control exciter 106.

Controller 114 can be configured to provide various outputs (e.g., to switches 107-110 or exciter 106) responsive to various inputs (e.g., from operating characteristic monitors I, V, T). Controller 114 may be any device, component, etc., or combination thereof, that can be configured accordingly, such as a processor, computing device, protective relaying device, etc.

In an exemplary operation, during the operation of a generator that includes system 100, one or more operating characteristics I, V, T of SC field coil 102 are monitored to detect a quenching event of the SC coil 102 by controller 114. For example, controller 114 may be configured to determine the occurrence of a quenching event of SC coil 102 if a certain current, voltage, or temperature is detected, e.g., with respect to SC coil 102. If controller 114 determines a quenching event accordingly, controller 114 can open one or more of switches 107-110 to control a dissipation of the operating and/or fault current flow in SC coil 102 via armature coil 104. For example, in response to a detection of a quenching of SC coil 102, controller 114 may change the state of switch 107 and/or switch 108 to at least partially disconnect SC coil 102 from exciter 106 and at least partially connect SC coil 102 to armature coil 104. Furthermore, in some embodiments, controller 114 may also change the state of switch 109 and/or switch 110 to at least partially disconnect armature coil 104 from generator output 112. In some embodiments, controller 114 may change the state of switches 107-110 to place SC field 102 in series with armature coil 104. Furthermore, controller 114 may communicate with exciter 106 to cause it to stop producing excitation current for input to SC field coil 102. The partial or complete connection of SC field coil 102 to armature coil 104 dissipates the current flow in SC field coil 102 during a quenching event to prevent damage and facilitate recovery of the generator to normal operation.

Figure 2:
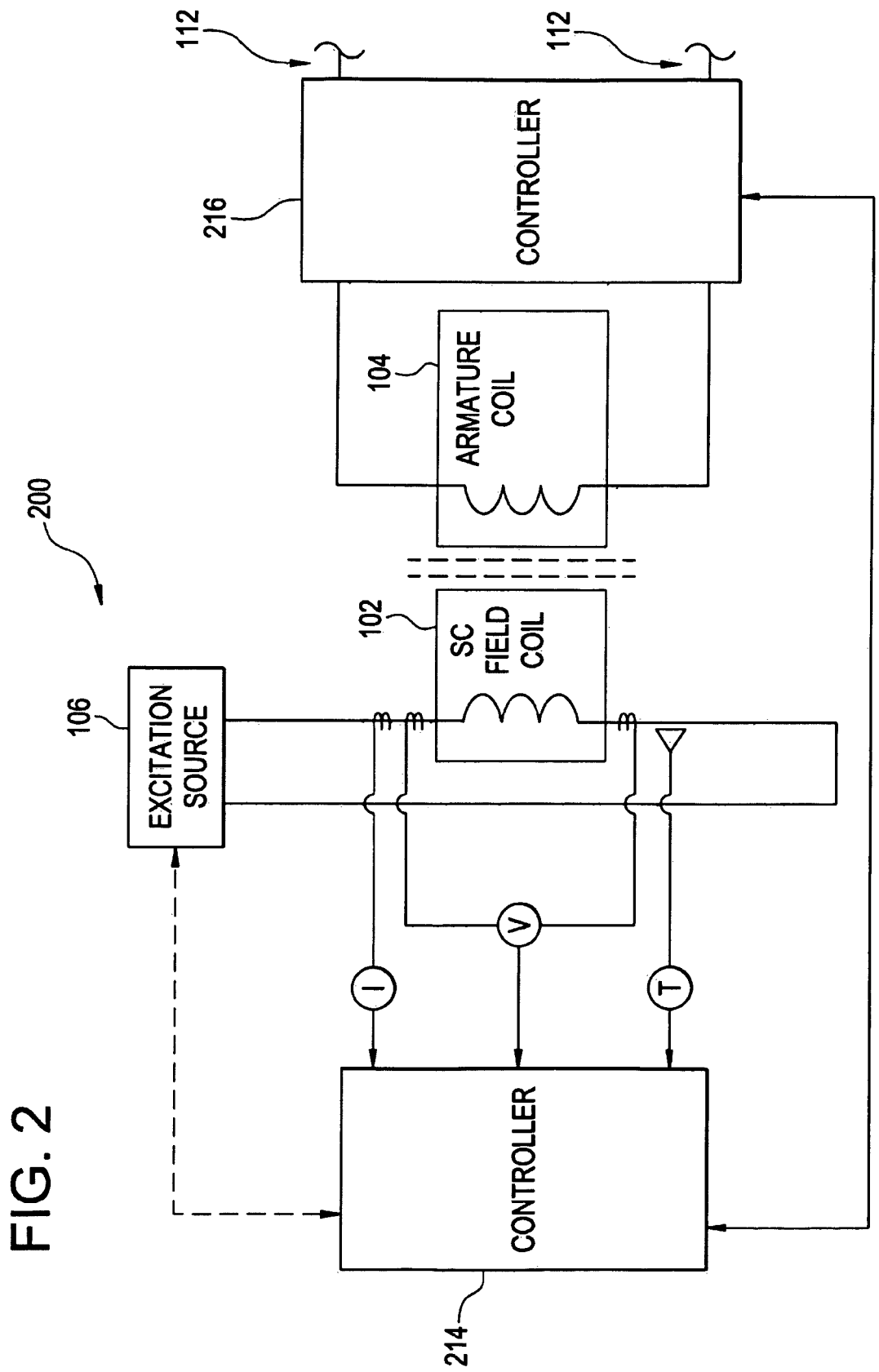
FIG. 2 is a schematic diagram illustrating another exemplary system for protection of superconducting generator field coils in accordance with exemplary embodiments of the invention.

FIG. 2 is a schematic diagram of another exemplary system 200 for protection of superconducting generator field coils in accordance with exemplary embodiments of the invention. System 200 has similarities (e.g., in structure, function, etc.) to system 100 as described above. For example, exemplary system 200 can be part of a superconducting generator and includes one or more SC field coils 102 and one or more armature coils 104 as described above. System 200 also includes an exciter 106, which was described above, that is connected to SC field coil 102. In addition to the above description, exciter 106 is configured to input an excitation current to SC field coil 102 in a first state and to stop inputting the excitation current to SC field coil 102 in a second state. In some embodiments, exciter 106 may also operate in a continuous conduction mode in the second state, whereby SC field coil 102 is essentially short circuited at the connection to exciter 106 (e.g., internal or external to exciter 106). In other embodiments, exciter 106 may alternatively operate in a negative forcing mode at a maximum ceiling voltage (or maximum negative forcing mode) that is reduced to a zero input mode (that may also include the continuous conduction mode) in the second state. In the maximum negative forcing mode, exciter 106 applies up to a maximum (or ceiling) level voltage to SC field coil 102 with a polarity that causes an opposition to the current flow in SC field coil 102, and this opposing voltage is decreased to zero as the current flow in SC field coil 102 decreases to zero (e.g., thereby decreasingly reversing the excitation current input to SC field coil 102).

System 200 also includes controller 214 that is similar to controller 114 described above. For example, controller 214 monitors one or more operating characteristics of SC field coil 102 such as current I, voltage V, and/or temperature T.

Controller 214 also controls exciter 106, e.g., to change its operation from the first state to the second state with respect to SC field coil 102. System 200 also includes a second controller 216 in communication with armature coil 104 and generator output 112, which was described above. Controller 216 is configured to control and/or modify one or more operating characteristics of armature coil 104, such as a magnitude, phase angle, etc. of a current flow in armature coil 104. Controller 216 can control and/or modify such characteristics to cause an inductive dissipation of current flow in SC coil 102 via armature coil 104. Controller 214 is in communication with controller 216 to modify such operating characteristics in response to a quenching event of SC coil 102. Controller 216 can also be structured and configured similar to controller 114 as described above, and may include additional components to function accordingly. For example, in some embodiments, controller 216 may include a converter device.

In an exemplary operation (similar to the description above for system 100), during the operation of a generator that includes system 200, one or more operating characteristics I, V, T of SC field coil 102 are monitored to detect a quenching event of the SC coil 102 by controller 214. If controller 214 determines a quenching event accordingly, controller 214 can communicate with controller 216 to cause it to modify an operating characteristic of armature coil 104 to cause an inductive dissipation of the current flow in SC coil 102. Furthermore, controller 214 may change exciter 106 from the first state to the second state as described above.

In some embodiments, an exemplary operation of system 200 wherein controller 214 detects a quenching event of SC coil 102 may include controller 216 causing (e.g., injecting) a current flow in the armature coil that produces a magneto-motive force (MMF) that is equal and opposite to an MMF produced by the current flow in the superconducting field coil to inductively stop the current flow in the superconducting field coil. For example, in response to a communication from controller 214, controller 216 may supply a significant d-axis (i.e., flux-axis) current to armature coil 104 that is sized to match the magneto-motive force (MMF) produced by the current flow in SC field coil 102. Since the magnetic flux in the SC field coil 102 is essentially trapped as a result, the current flow and associated MMF in SC field coil 102 is caused to drop to zero. At that point, controller 214 can cause exciter 106 to change from the first state to the second state as described above. Thereafter, controller 216 (e.g., responsive to controller 214) can decrease the current flow in armature coil 104 to dissipate the resultant magnetic flux in armature coil 104. In some embodiments, controller 216 will decrease the current flow in armature coil 104 to none (e.g., zero) at a controlled rate (e.g., gradually). Furthermore, in some embodiments, controller 216 will decrease the current flow in armature coil 104 by dissipating the resultant energy produced by the generator (e.g., via armature coil 104) via a mechanical load connected to the generator such as one or more turbine auxiliaries.

The foregoing exemplary operations of systems 100, 200 can also describe a method for protecting superconducting generator field coils in accordance with exemplary embodiments of the invention. In that regard, FIG. 3 is a flow diagram illustrating an exemplary method 300 for protecting superconducting generator field coils. Exemplary method 300 includes block 302 in which a quenching of a superconducting field coil of a generator is monitored. This monitoring can be done, e.g., according to one or more of the exemplary operations described above for systems 100, 200. For example, the monitoring may be done by monitoring one or more operating characteristics of the SC field coil, such as the current flow, voltage, or temperature with respect to the SC field coil.

Exemplary method 300 also includes block 304 in which a current flow in the SC field coil is dissipated via an armature coil of the generator in response to a detection of a quenching of the SC field coil. This dissipating can also be done, e.g., according to one or more of the exemplary operations described above for systems 100, 200. For example, in some embodiments, the current flow in the SC field coil can be dissipated by at least partially disconnecting the SC field coil from an excitation source of the generator and at least partially connecting the SC field coil to an armature coil of the generator, where in some embodiments, the SC field coil is placed in series with the armature coil for such dissipation. In other embodiments, the current flow in the SC field coil can be dissipated by modifying a current flow in the armature coil to inductively oppose the current flow in the SC field coil.

The exemplary systems 100, 200 for protection of superconducting generator field coils are illustrated and described with respect to various elements, components, etc., such as controllers 114, 214, exciter 106, and switches 107-110, for exemplary purposes. However, it should be understood that other variations, combinations, or integrations of such elements that provide the same features, functions, etc. are included within the scope of embodiments of the invention. For example, the functions of controller 114 and exciter 106 may be provided by a single component in some embodiments, and the functions of controller 214 and controller 216 may be provided by a single component in other embodiments. As another example, the functions of switches 107, 108 may be integrated into exciter 106 in some embodiments. Other possibilities will be recognized in light of the description herein.

It should be understood that the flow diagram(s) depicted herein are examples. There may be many variations to these diagrams or the blocks (or operations) described therein within the scope of embodiments of the invention. For example, the blocks may be performed in a different order, or blocks may be added, deleted, or modified.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed is:

1. A system for protecting superconducting generator field coils, comprising:
    a controller configured to monitor for a quenching of a superconducting field coil of a generator and control a dissipation of a current flow in the superconducting field coil in an event of the quenching; and
    an armature coil of the generator configured to cause the dissipation of the current flow in the superconducting field coil responsive to the controller in the event of the quenching of the superconducting field coil via a first switch and a second switch, wherein the first switch and the second switch connect the superconducting field coil to an excitation source of the generator in a first state and connect the superconducting field coil to at least a portion of the armature coil in a second state and the controller is configured to control the dissipation of the current flow in the superconducting field coil in the event of the quenching by causing the first switch and the second switch to change from the first state to the second state.

2. The system of claim 1, wherein the controller is configured to monitor for the quenching of the superconducting field coil by monitoring an operating characteristic of the superconducting field coil.

3. The system of claim 2, wherein the operating characteristic of the superconducting field coil monitored by the controller is at least one of the current flow in the superconducting field coil, a voltage of the superconducting field coil, or a temperature of the superconducting field coil.

4. The system of claim 1, wherein the controller is further configured to communicate with an excitation source of the generator to stop the input of an excitation current to the superconducting field coil in the event of the quenching.

5. The system of claim 1, wherein:
    the armature coil is further configured to cause the dissipation of the current flow in the superconducting field coil via a third switch, wherein the third switch connects the armature coil to an output of the generator in a first state and disconnects the armature coil from the output of the generator in a second state; and
    the controller is further configured to control the dissipation of the current flow in the superconducting field coil in the event of the quenching by causing the third switch to change from the first state to the second state to place the superconducting field coil in series with at least the portion of the armature coil.

6. A system for protecting superconducting generator field coils, comprising:
    a controller configured to monitor for a quenching of a superconducting field coil of a generator and control a dissipation of a current flow in the superconducting field coil in an event of the quenching; and
    an armature coil of the generator configured to cause the dissipation of the current flow in the superconducting field coil responsive to the controller in the event of the quenching of the superconducting field coil, wherein the armature coil is configured to cause the dissipation of the current flow in the superconducting field coil via a second controller and an excitation source of the generator, wherein:
    the superconducting field coil is connected to the excitation source and configured to input an excitation current to the superconducting field coil in a first state and to stop or decreasingly reverse the input of the excitation current to the superconducting field coil in a second state;
    the second controller is configured to modify an operating characteristic of the armature coil to cause an inductive dissipation of the current flow in the superconducting field coil via the armature coil; and
    the controller is configured to control the dissipation of the current flow in the superconducting field coil in the event of the quenching by causing the second controller to modify the operating characteristic of the armature coil and causing the excitation source to change from the first state to the second state.

7. The system of claim 6, wherein the operating characteristic of the armature coil modified by the second controller is a current flow in the armature coil, wherein the current flow is modified to cause the inductive opposition of the current flow in the superconducting field coil.

8. The system of claim 6, wherein the controller and the second controller are integrated as a single controller.

9. A method for protecting superconducting generator field coils, comprising:
   monitoring for a quenching of a superconducting field coil of a generator; and
   dissipating a current flow in the superconducting field coil via an armature coil of the generator in response to a detection of the quenching,
   wherein dissipating a current flow in the superconducting field coil comprises at least partially disconnecting the superconducting field coil from an excitation source of the generator and at least partially connecting the superconducting field coil to at least a portion of the armature coil of the generator.

10. The method of claim 9, wherein monitoring for a quenching comprises monitoring an operating characteristic of the superconducting field coil.

11. The method of claim 10, wherein monitoring an operating characteristic comprises monitoring at least one of the current flow in the superconducting field coil, a voltage of the superconducting field coil, or a temperature of the superconducting field coil.

12. The method of claim 9, further comprising communicating with an excitation source of the generator to stop the input of an excitation current to the superconducting field coil in response to the detection of the quenching.

13. The method of claim 9, wherein dissipating a current flow in the superconducting field coil further comprises at least partially disconnecting the armature coil from an output of the generator.

14. The method of claim 13, wherein dissipating a current flow in the superconducting field coil comprises placing the superconducting field coil in series with the armature coil by disconnecting the superconducting field coil from the excitation source of the generator, connecting the superconducting field coil to at least a portion of the armature coil, and disconnecting the armature coil from the output of the generator.

15. A method for protecting superconducting generator field coils, comprising:
   monitoring for a quenching of a superconducting field coil of a generator; and
   dissipating a current flow in the superconducting field coil via an armature coil of the generator in response to a detection of the quenching, wherein dissipating a current flow in the superconducting field coil comprises modifying an operating characteristic of the armature coil to cause an inductive dissipation of the current flow in the superconducting field coil via the armature coil and causing an excitation source of the generator to stop inputting an excitation current to the superconducting field coil.

16. The method of claim 15, wherein modifying an operating characteristic of the armature coil comprises modifying a current flow in the armature coil to cause the inductive opposition of the current flow in the superconducting field coil.

17. The method of claim 15, wherein dissipating a current flow in the superconducting field coil comprises:
   causing a current flow in the armature coil, that produces a magneto-motive force (MMF) that is equal and opposite to an MMF produced by the current flow in the superconducting field coil to inductively stop the current flow in the superconducting field coil;
   placing the excitation source into a continuous conduction mode or a maximum negative forcing mode that decreases to the continuous conduction mode; and
   dissipating a resultant magnetic field in the armature coil by decreasing the current flow in the armature coil.

18. The method of claim 17, wherein dissipating a resultant magnetic field comprises decreasing the current flow in the armature coil to none at a controlled rate.

19. The method of claim 17, wherein dissipating a resultant magnetic field comprises dissipating a resultant energy produced by the generator via a mechanical load connected to the generator.

* * * * *